US012537310B2

(12) United States Patent
Guan et al.

(10) Patent No.: US 12,537,310 B2
(45) Date of Patent: Jan. 27, 2026

(54) ANTENNA AND ELECTRONIC DEVICE

(71) Applicant: Honor Device Co., Ltd., Shenzhen (CN)

(72) Inventors: Qiao Guan, Shenzhen (CN); Kunpeng Wei, Shenzhen (CN); Yi Wang, Shenzhen (CN); Simin Hou, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 104 days.

(21) Appl. No.: 18/571,262

(22) PCT Filed: Aug. 29, 2022

(86) PCT No.: PCT/CN2022/115531
§ 371 (c)(1),
(2) Date: Dec. 18, 2023

(87) PCT Pub. No.: WO2023/071492
PCT Pub. Date: May 4, 2023

(65) Prior Publication Data

US 2024/0291161 A1 Aug. 29, 2024

(30) Foreign Application Priority Data

Nov. 1, 2021 (CN) ......................... 202111282691.5

(51) Int. Cl.
*H01Q 13/18* (2006.01)
*H01Q 1/22* (2006.01)
*H04N 5/64* (2006.01)

(52) U.S. Cl.
CPC ........... *H01Q 13/18* (2013.01); *H01Q 1/2291* (2013.01); *H04N 5/64* (2013.01)

(58) Field of Classification Search
CPC .. H01Q 1/22; H01Q 1/24; H01Q 1/36; H01Q 1/50; H01Q 13/10
See application file for complete search history.

(56) References Cited

U.S. PATENT DOCUMENTS

2005/0017914 A1 1/2005 Huang
2010/0182205 A1 7/2010 Chiang
(Continued)

FOREIGN PATENT DOCUMENTS

CN 201378625 Y 1/2010
CN 102097685 A 6/2011
(Continued)

*Primary Examiner* — Hoang V Nguyen
(74) *Attorney, Agent, or Firm* — Leydig, Voit & Mayer, Ltd.

(57) ABSTRACT

Embodiments of this application are applicable to the field of antenna technologies, and provide an antenna and an electronic device. The antenna includes a first resonant cavity and a feed. The first resonant cavity includes a first slot and a second slot, the first slot is provided on a first plane in the first resonant cavity; the second slot is provided on a second plane that is in the first resonant cavity and that is adjacent to the first plane, and the first plane and the second plane are perpendicular to a plane on which the metal backplane is located; and the feed is disposed in the first resonant cavity for feeding the antenna. By using the antenna provided in the embodiments of this application, signal coverage in front of a screen of the electronic device can be increased.

17 Claims, 16 Drawing Sheets

(56) References Cited

U.S. PATENT DOCUMENTS

| | | | | |
|---|---|---|---|---|
| 2014/0184450 | A1* | 7/2014 | Koo | H01Q 1/2266 343/702 |
| 2014/0203974 | A1 | 7/2014 | Liu et al. | |

FOREIGN PATENT DOCUMENTS

| | | | | | |
|---|---|---|---|---|---|
| CN | 105140651 | A | | 12/2015 | |
| CN | 105244626 | A | | 1/2016 | |
| CN | 207038709 | U | | 2/2018 | |
| CN | 112993579 | A | | 6/2021 | |
| CN | 114171893 | A | | 3/2022 | |
| JP | 2010187107 | A | * | 8/2010 | H01Q 13/16 |

* cited by examiner

A

B

ANTENNA AND ELECTRONIC DEVICE

CROSS-REFERENCE TO RELATED APPLICATIONS

This application is a national stage of International Application No. PCT/CN2022/115531, filed on Aug. 29, 2022, which claims priority to Chinese Patent Application No. 202111282691.5, filed on Nov. 1, 2021. The disclosures of both of the aforementioned applications are hereby incorporated by reference in their entireties.

TECHNICAL FIELD

Embodiments of this application relate to the field of antenna technologies, and in particular, to an antenna and an electronic device.

BACKGROUND

With development of communication technologies, an antenna is usually disposed on an electronic device, and is configured to implement a communication connection to another electronic device. For example, an antenna is disposed on a television, and the television is connected to a remote control by using the antenna, so that the remote control can control the television.

The electronic device is usually further integrated with another functional device. The television is still used as an example. The television usually has a speaker, a supporting stand, and the like. These devices need to be mounted at specified locations. Therefore, the antenna is usually disposed at a location at which two sides of the television intersect. When the antenna is disposed at the location at which the two sides of the television intersect, directivity of the antenna is high, and coverage in front of a screen of the television is poor.

Based on this, it is necessary to provide an antenna with low directivity, to increase signal coverage in front of the screen of the television.

SUMMARY

Embodiments of this application provide an antenna and an electronic device, which can increase signal coverage in front of a screen of a television.

According to a first aspect, an antenna is provided. The antenna is disposed in an electronic device, the electronic device includes a metal backplane, and the antenna includes a first resonant cavity and a feed: the first resonant cavity includes a first slot and a second slot, the first slot is provided on a first plane in the first resonant cavity, and the first plane is a plane on which a long side of the first resonant cavity is located: the second slot is provided on a second plane that is in the first resonant cavity and that is adjacent to the first plane, and the first plane and the second plane are perpendicular to a plane on which the metal backplane is located; and the feed is disposed in the first resonant cavity for feeding the antenna.

The antenna provided in this embodiment of this application is disposed in the electronic device. The electronic device includes the metal backplane, and the antenna includes the first resonant cavity and the feed. The first resonant cavity includes the first slot and the second slot, the first slot is provided on the first plane in the first resonant cavity, and the first plane is the plane on which the long side of the first resonant cavity is located. The second slot is provided on the second plane that is in the first resonant cavity and that is adjacent to the first plane, and the first plane and the second plane are perpendicular to the plane on which the metal backplane is located. The feed is disposed in the first resonant cavity for feeding the antenna. The antenna including the first resonant cavity is used to radiate a signal by using the first slot and the second slot on the first resonant cavity, so that the antenna in this embodiment of this application can be used to increase a dimension of a radiation direction of a slot antenna, thereby reducing antenna directivity. Therefore, the signal can cover most areas in front of a screen of the electronic device, increasing signal coverage in front of the screen of the electronic device.

In an embodiment, the first resonant cavity is an L-shaped resonant cavity.

In this embodiment of this application, the L-shaped resonant cavity is used as the first resonant cavity. Through simulation and testing, for the antenna using the L-shaped resonant cavity as the first resonant cavity, coverage in front of a screen is optimal.

In an embodiment, the L-shaped resonant cavity is disposed at a location at which a first side and a second side of the electronic device intersect, a distance between the first plane and the first side is the smallest, and a distance between the second plane and the second side is the smallest.

It should be understood that the first side and the second side are outer bezels of the electronic device. A distance between each plane of the L-shaped resonant cavity and the first side is a distance between each plane and an outer bezel of the electronic device in a first side direction. A distance between each plane of the L-shaped resonant cavity and the second side is a distance between each plane and an outer bezel of the electronic device in a second side direction. The first plane is a plane with a smallest distance from the first side, and the first plane is a plane of the first resonant cavity facing outward along the first side. The second plane is a plane with a smallest distance from the second side, and the second plane is a plane of the first resonant cavity facing toward along the second side. That is, the first slot provided on the first plane faces an outer side of the electronic device, and the second slot provided on the second plane faces the outer side of the electronic device.

In an embodiment, a size of the first slot and a size of the second slot are associated with an operating frequency band of the antenna.

It should be understood that a width of the slot does not affect a boundary condition of the antenna. Therefore, the operating frequency band of the antenna is strongly associated with only a length of the first slot and a length of the second slot.

In an embodiment, the length of the first slot is the same as the length of the second slot.

In this embodiment of this application, when the length of the first slot is the same as the length of the second slot, it is equivalent to that lengths of radiation ports of the antenna in different directions are the same. The antenna radiates a signal by using the first slot and the second slot with the same length, so that the signal can provide even coverage in each direction in front of the screen of the electronic device. This is equivalent to increasing coverage in front of the screen of the electronic device.

In an embodiment, the antenna further includes a filling medium, and the filling medium is disposed between the feed and the first resonant cavity for fixing the feed.

In this embodiment of this application, the antenna further includes the filling medium, and the filling medium is disposed between the feed and the first resonant cavity for fixing the feed. The filling medium is used to fix the feed, that is, an existing component in the antenna may be used to fix the feed. This avoids using an independent device to fix the feed, avoids material wastes, and reduces antenna costs.

In an embodiment, the first resonant cavity further includes a third slot, the third slot is provided on a third plane in the first resonant cavity, the third plane is adjacent to the first plane or the second plane, and the third plane is perpendicular to the plane on which the metal backplane is located.

The antenna provided in this embodiment of this application is disposed in the electronic device. The electronic device includes the metal backplane, and the antenna includes the first resonant cavity and the feed. The first resonant cavity includes the first slot, the second slot, and the third slot. The first slot is provided on the first plane in the first resonant cavity. The second slot is provided on the second plane that is in the first resonant cavity and that is adjacent to the first plane. The third slot is provided on the third plane of the first resonant cavity. The first plane, the second plane, and the third plane are perpendicular to the plane on which the metal backplane is located. The third plane is adjacent to the first plane or the second plane. The feed is disposed in the first resonant cavity. The antenna including the first resonant cavity is used to radiate a signal by using the first slot, the second slot, and the third slot on the first resonant cavity, so that the antenna in this embodiment of this application can be used to increase a dimension of a radiation direction of the slot antenna, thereby reducing antenna directivity. Therefore, the signal can cover most areas in front of a screen of the electronic device, increasing signal coverage in front of the screen of the electronic device.

In an embodiment, the size of the first slot, the size of the second slot, and a size of the third slot are associated with the operating frequency band of the antenna.

It should be understood that a width of the slot does not affect a boundary condition of the antenna. Therefore, the operating frequency band of the antenna is strongly associated with only a length of the first slot, a length of the second slot, and a length of the third slot.

In an embodiment, the operating frequency band of the antenna is determined according to a first formula, and the first formula includes:

$$f = \frac{1}{\sqrt{\mu\varepsilon}}\sqrt{\left(\frac{m}{2a}\right)^2 + \left(\frac{n}{2b}\right)^2 + \left(\frac{p}{2l}\right)^2},$$

where μ represents magnetic permeability of the filling medium: ε represents permittivity of the filling medium: m represents a quantity of half-wavelengths of an equivalent cavity in an X-axis direction, and the equivalent cavity is a rectangular resonant cavity equivalent to the first resonant cavity: a represents a length of the equivalent cavity in the X-axis direction: n represents a quantity of half-wavelengths of the equivalent cavity in a Y-axis direction: b represents a length of the equivalent cavity in the Y-axis direction: p represents a quantity of half-wavelengths of the equivalent cavity in a Z-axis direction; and l represents a length of the equivalent cavity in the Z-axis direction, and the length of the equivalent cavity in the Z-axis direction is determined based on a slot size of the first resonant cavity.

In this embodiment of this application, the operating frequency band of the antenna is related to the slot size of the first resonant cavity. Therefore, when the operating frequency band is determined, a slot size that better matches the operating frequency band of the antenna can be determined according to the first formula, so that performance of the antenna on the operating frequency band of the antenna is good, thereby increasing coverage in front of the screen of the electronic device adopting the antenna.

In an embodiment, the feed is disposed at a location with maximum electric field strength of a fundamental mode in the first resonant cavity.

It should be understood that, because the first resonant cavity may be an L-shaped resonant cavity, the location with the maximum electric field strength of the fundamental mode may be a location with maximum electric field strength of a fundamental mode of the equivalent cavity: A specific location of the location with the maximum electric field strength of the fundamental mode in the first resonant cavity may be determined through simulation.

In this embodiment of this application, the feed is disposed at the location with the maximum electric field strength of the fundamental mode of the first resonant cavity, so that impedance matching of the antenna that operates on a frequency band of the fundamental mode of the first resonant cavity can be better, thereby improving radiation efficiency and increasing bandwidth of the antenna.

In an embodiment, the feed is fixed to the metal backplane by using a screw.

In this embodiment of this application, the feed may be fixed to the metal backplane by using the screw, so that a manner for fixing the feed is more convenient.

According to a second aspect, an electronic device is provided, and the electronic device includes the antenna according to the first aspect.

In an embodiment, the electronic device includes a display, and a size of the display is greater than a preset threshold.

In an embodiment, the electronic device is a smart large screen.

An implementation and beneficial effects of the electronic device are similar to those of the antenna according to the first aspect. Details are not described herein again.

DESCRIPTION OF EMBODIMENTS

The following clearly and completely describes the technical solutions in embodiments of this application with reference to the accompanying drawings. In descriptions of the embodiments of this application, unless otherwise stated, "/" indicates a meaning of "or", for example, A/B may indicate A or B. "And/or" in the specification is merely used to describe an association relationship between associated objects, and indicates that three relationships may exist. For example, A and/or B may indicate that there are three cases: Only A exists, both A and B exist, and only B exists. In addition, in the descriptions of the embodiments of this application, "a plurality of" means two or more.

The following terms "first" and "second" are merely intended for descriptive purposes, and shall not be understood as an implication or implication of relative importance or an implicit indication of a quantity of indicated technical features. Therefore, features defined with "first" and "second" may explicitly or implicitly include one or more features. In the descriptions of the embodiments of this application, unless otherwise specified, "a plurality of" means two or more.

Figure 1:
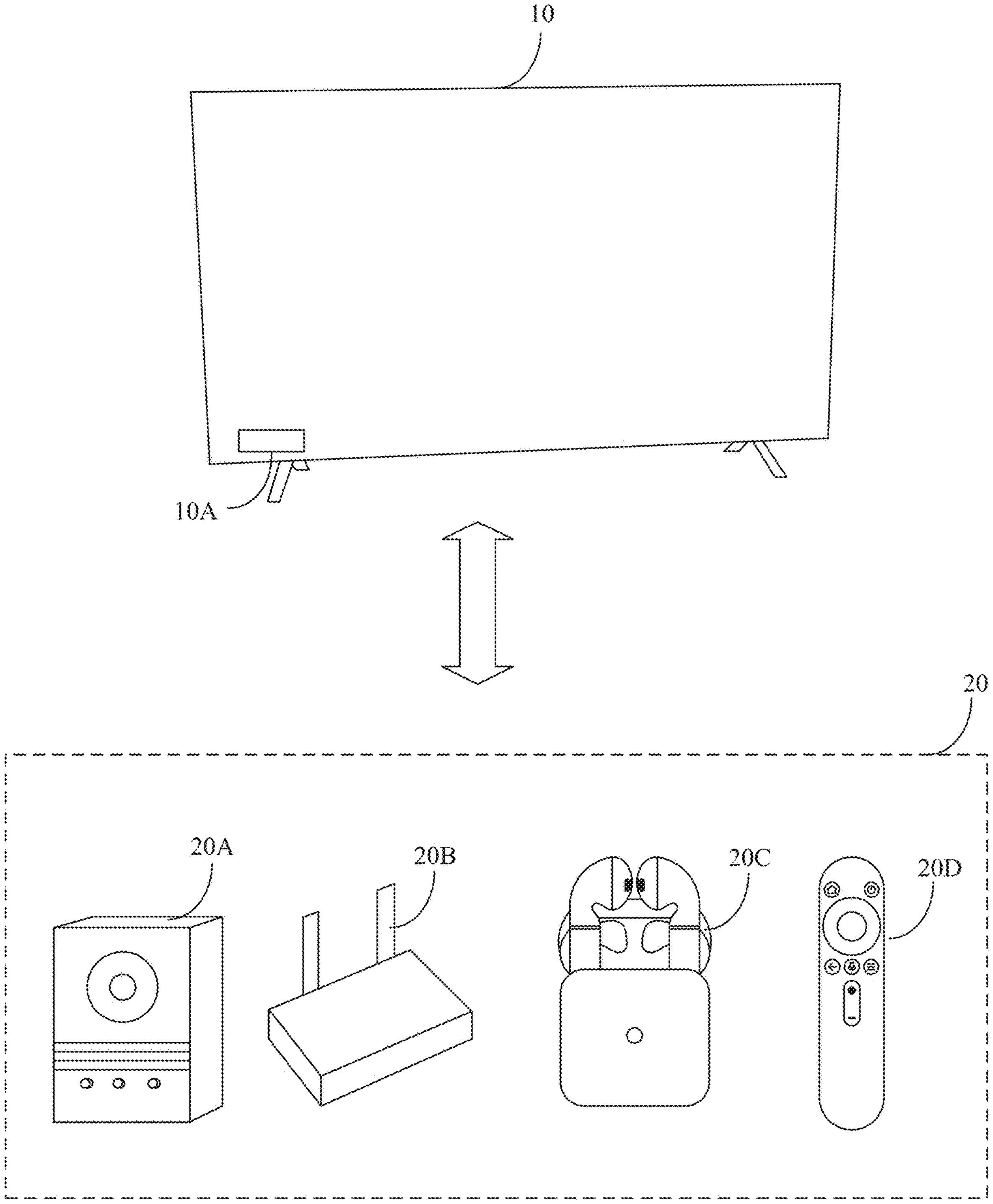
FIG. 1 is a schematic diagram of a communication connection between an electronic device and another electronic device according to an embodiment.

Currently, an antenna is usually disposed on an electronic device, and is configured to implement a communication connection to another electronic device. For example, as shown in FIG. 1, a television 10 is communicatively connected to another electronic device 20 by using an antenna 10A. Some other electronic devices 20 may be a Bluetooth speaker 20A, a router 20B, a Bluetooth headset 20C, or a remote control 20D. This is not limited in embodiments of this application.

Figure 2:
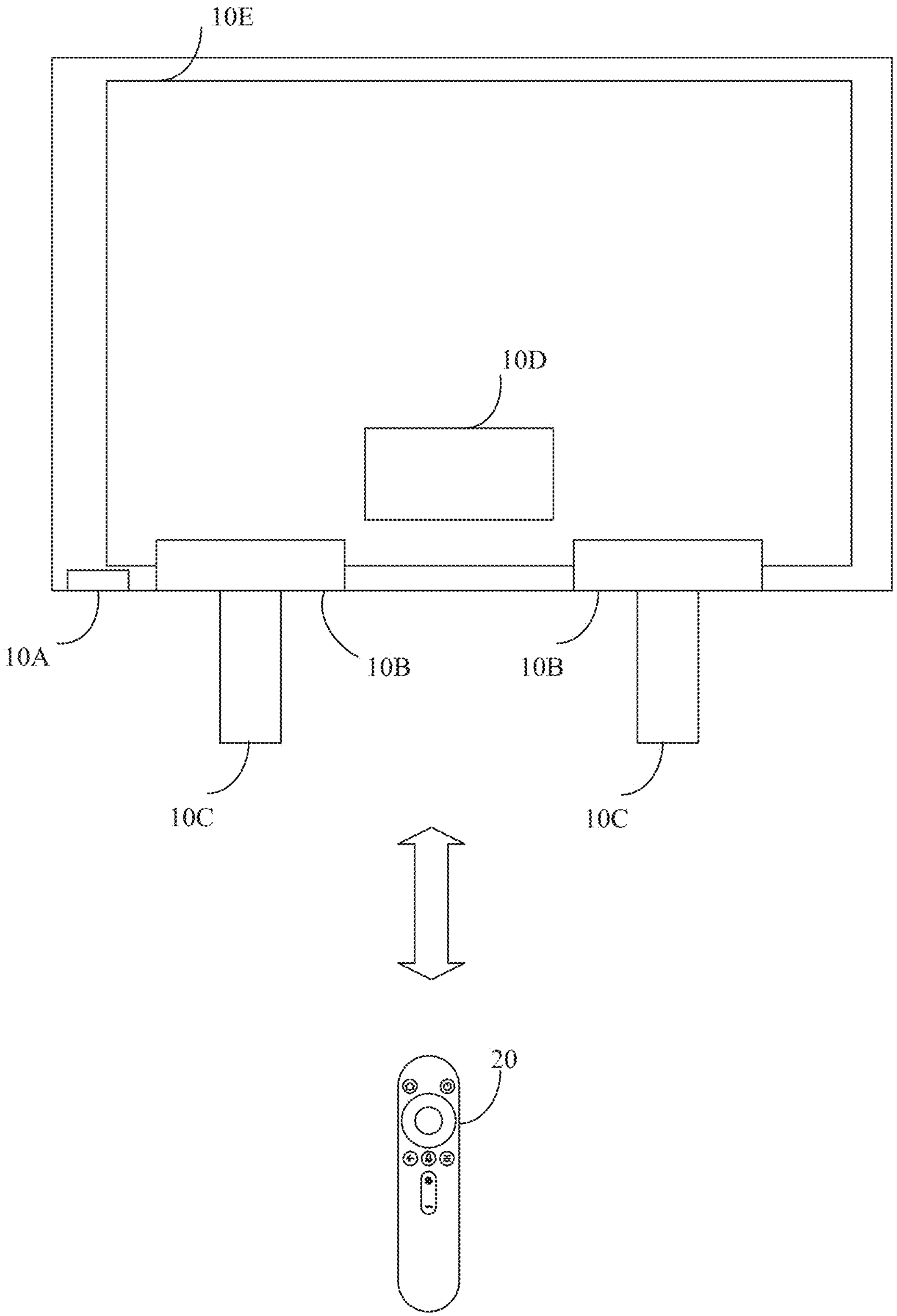
FIG. 2 is a schematic diagram of a connection between a television and a remote control according to an embodiment.
Figure 3:
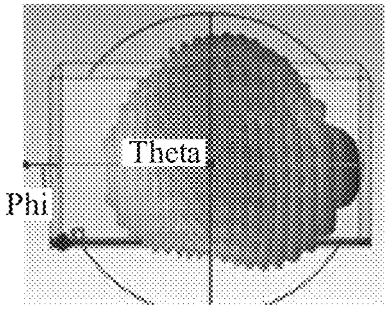
FIG. 3 is a directivity pattern of a microstrip antenna and a scenario distribution diagram of an electric field according to an embodiment.
Figure 3:
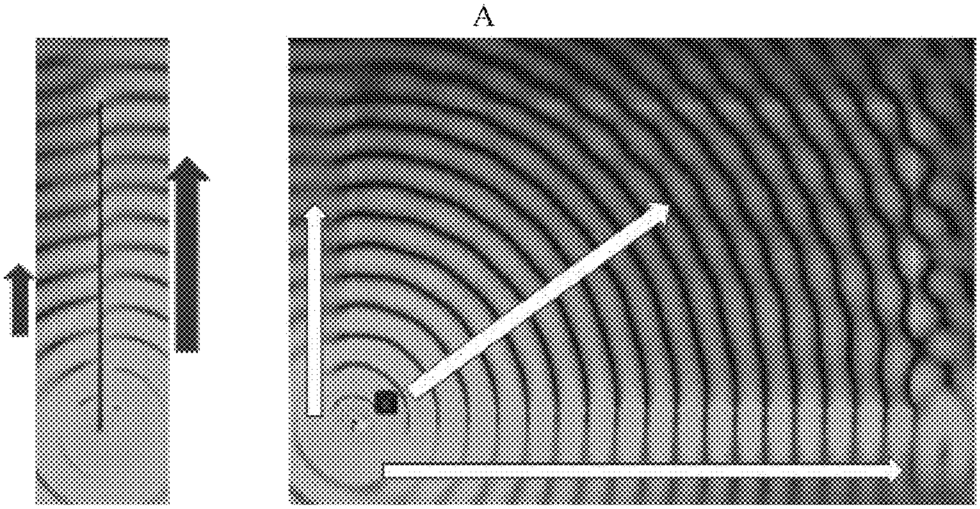

The following uses an example in which the electronic device is a television and the another electronic device is a remote control for description. As shown in FIG. 2, the antenna 10A is disposed on the television, and the television is connected to the remote control 20 by using the antenna 10A, so that the remote control 20 can control the television. Usually, other devices are further integrated on the television, for example, a speaker 10B, a supporting stand 10C, and a logic board 10D (T-CON) shown in FIG. 2. These devices need to be disposed in restricted areas of the television 10, to better implement corresponding functions. For example, the supporting stand 10C can support the television only when being disposed at a bottom of the television. Because other devices of the television occupy areas on the television, an area in which the antenna 10A can be disposed is usually limited to a location at which two sides of the television intersect. In the conventional technology, a microstrip antenna (Patch Antenna, PIFA) is usually used as an antenna for communicating with another electronic device. When the PIFA is disposed at the location at which the two sides of the television intersect, a directivity pattern of the PIFA is shown in A in FIG. 3, and directivity is relatively high. A distribution diagram of electric field strength of the PIFA in a vertical direction and a horizontal direction is shown in B in FIG. 3, the electric field strength changes significantly, and attenuation of field strength in front of a screen is faster than that behind the screen. That is, the PIFA is used as the antenna 10A of the television, and consequently signal coverage in front of the screen of the television is poor, and communication between the television and another electronic device in front of the screen is poor.

Further, a metal backplane 10E is usually disposed on the television, and a size of the metal backplane 10E is usually large. When the antenna 10A on the television is a PIFA, the PIFA is more susceptible to a ground current induced by the metal backplane 10E, resulting in an increase in zero points on a directivity pattern, ripple deepening on a horizontal directivity pattern, further increasing antenna directivity, and further deteriorating signal coverage in front of the screen of the television.

In view of this, this application provides an antenna. When the antenna is disposed at the location at which the two sides of the television intersect, directivity of the antenna can be reduced, and signal coverage in front of the screen of the television can be increased. An antenna in an embodiment of this application includes a first resonant cavity, a feed, and a filling medium. The first resonant cavity includes a first slot and a second slot, the first slot is provided on a first plane that is in the first resonant cavity and that is adjacent to a first location, the second slot is provided on a second plane that is in the first resonant cavity and that is adjacent to the first location, and the first plane and the second plane are perpendicular to a plane on which the metal backplane is located. The first location is a location at which two sides of the electronic device intersect. A signal is radiated by using the first slot and the second slot on the first resonant cavity, so that directivity of the antenna can be effectively reduced, and signal coverage in front of a screen of the electronic device can be increased.

Details are described below with reference to embodiments shown in FIG. 4 to FIG. 15.

Figure 4:
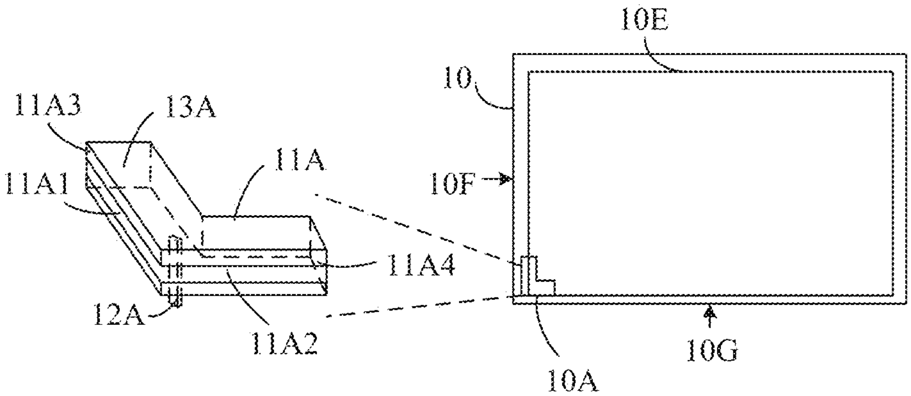
FIG. 4 is a schematic diagram of a structure of an antenna according to an embodiment of this application.

FIG. 4 is a schematic diagram of a structure of an antenna according to an embodiment of this application. As shown in FIG. 4, this embodiment of this application provides an antenna 10A. The antenna 10A is disposed in an electronic device 10, the electronic device 10 includes a metal backplane 10E, and the antenna 10A includes a first resonant cavity 11A and a feed 12A. The first resonant cavity 11A includes a first slot 11A1 and a second slot 11A2. The first slot 11A1 is provided on a first plane 11A3 in the first resonant cavity 11A, and the first plane 11A3 is a plane on which a long side of the first resonant cavity 11A is located. The second slot 11A2 is provided on a second plane 11A4 that is in the first resonant cavity 11A and that is adjacent to the first plane 11A3, and the first plane 11A3 and the second plane 11A4 are perpendicular to a plane on which the metal backplane 10E is located. The feed 12A is disposed in the first resonant cavity 11A for feeding the antenna.

It should be understood that the first resonant cavity 11A may be disposed at any location of the electronic device. In a possible case, the first resonant cavity 11A may be disposed at any location at which two sides of the electronic device 10 intersect, namely, locations at which four corners of the electronic device 10 are located. Optionally, the first resonant cavity 11A may be disposed at a location at which a first side 10F and a second side 10G of the electronic device 10 intersect. For example, as shown in FIG. 4, the first resonant cavity 11A is at a location at which a horizontal side and a vertical side in a lower left corner of the electronic device 10 intersect.

Still as shown in FIG. 4, the first resonant cavity 11A includes the first slot 11A1 and the second slot 11A2. The first slot 11A1 is provided on the first plane 11A3 in the first resonant cavity 11A, and the first plane 11A3 is the plane on which the long side of the first resonant cavity 11A is located. The second slot 11A2 is provided on the second plane 11A4 that is in the first resonant cavity 11A and that is adjacent to the first plane 11A3, and the first plane 11A3 and the second plane 11A4 are perpendicular to the plane on which the metal backplane 10E is located.

In a possible case, optionally, a distance between the first plane 11A3 and the first side 10F of the electronic device is the smallest, and a distance between the second plane 11A4 and the second side 10G of the electronic device 10 is the smallest.

It should be understood that the first side 10F and the second side 10G are outer bezels of the electronic device 10. A distance between each plane of the first resonant cavity 11A and the first side 10F is a distance between each plane and an outer bezel of the electronic device 10 in a direction of the first side 10F. A distance between each plane of the first resonant cavity 11A and the second side 10G is a distance between each plane and an outer bezel of the electronic device 10 in a direction of the second side 10G. The first plane 11A3 is a plane with a smallest distance from the first side 10F. In this case, the first plane 11A3 is a plane of the first resonant cavity 11A facing outward along the first side 10F. The second plane 11A4 is a plane with a smallest distance from the second side 10G. In this case, the second plane 11A4 is a plane of the first resonant cavity 11A facing outward along the second side 10G. That is, the first slot 11A1 provided on the first plane 11A3 faces an outer side of the electronic device 10, and the second slot 11A2 provided on the second plane 11A4 faces the outer side of the electronic device 10.

For example, as shown in FIG. 4, in planes that are of the first resonant cavity 11A and that are perpendicular to the metal backplane 10E, there are two planes facing the outer side of the electronic device, which are respectively the first plane 11A3 and the second plane 11A4.

It should be understood that a length of the first slot 11A1 may be the same as a length of the first plane 11A3, or may be slightly less than the length of the first plane 11A3. This is not limited in this embodiment of this application. A length of the second slot 11A2 may be the same as a length of the second plane 11A4, or may be slightly less than the length of the second plane 11A4. This is not limited in this embodiment of this application.

Optionally, the first resonant cavity 11A is an L-shaped resonant cavity.

Figure 5:
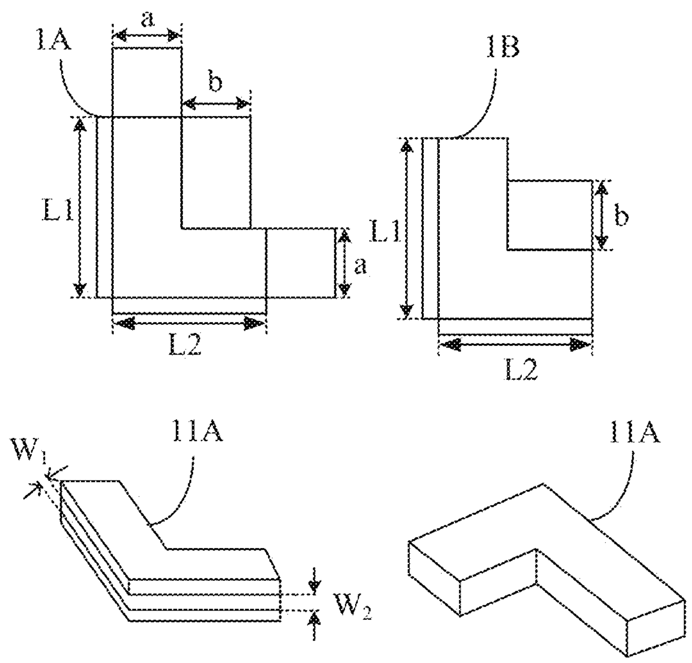
FIG. 5 is a schematic diagram of a structure of a first resonant cavity according to an embodiment of this application.

As shown in FIG. 5, the first resonant cavity 11A may be obtained by bending a first steel sheet 1A and a second steel sheet 1B. L1 is the length of the first slot 11A1, L2 is the length of the second slot 11A2, α represents a width of the first resonant cavity 11A, b represents a height of the first resonant cavity 11A, $w_1$ represents a width of the first slot, and $w_2$ represents a width of the second slot. It should be noted that, $w_1$ may be equal to $w_2$. Through simulation and testing, for the antenna using an L-shaped resonant cavity as the first resonant cavity, coverage in front of a screen is optimal.

Optionally, a size of the first slot 11A1 and a size of the second slot 11A2 are associated with an operating frequency band of the antenna 10A.

A width of the slot does not affect a boundary condition of the antenna. Therefore, the operating frequency band of the antenna 10A is strongly associated with only the length of the first slot 11A1 and the length of the second slot 11A2.

For example, the operating frequency band of the antenna 10A may be determined according to the following formula:

$$f = \frac{1}{\sqrt{\mu\varepsilon}}\sqrt{\left(\frac{m}{2a}\right)^2 + \left(\frac{n}{2b}\right)^2 + \left(\frac{p}{2l}\right)^2},$$

where μ represents magnetic permeability of a filling medium 13A: ε represents permittivity of the filling medium 13A: m represents a quantity of half-wavelengths of an equivalent cavity in an X-axis direction, and the equivalent cavity is a rectangular resonant cavity equivalent to the first resonant cavity 11A: a represents a length of the equivalent cavity in the X-axis direction: n represents a quantity of half-wavelengths of the equivalent cavity in a Y-axis direction: b represents a length of the equivalent cavity in the Y-axis direction: p represents a quantity of half-wavelengths of the equivalent cavity in a Z-axis direction; and l represents a length of the equivalent cavity in the Z-axis direction, and the length of the equivalent cavity in the Z-axis direction is determined based on the length of the first slot 11A1 and the length of the second slot 11A2 on the first resonant cavity 11A.

Figure 6:
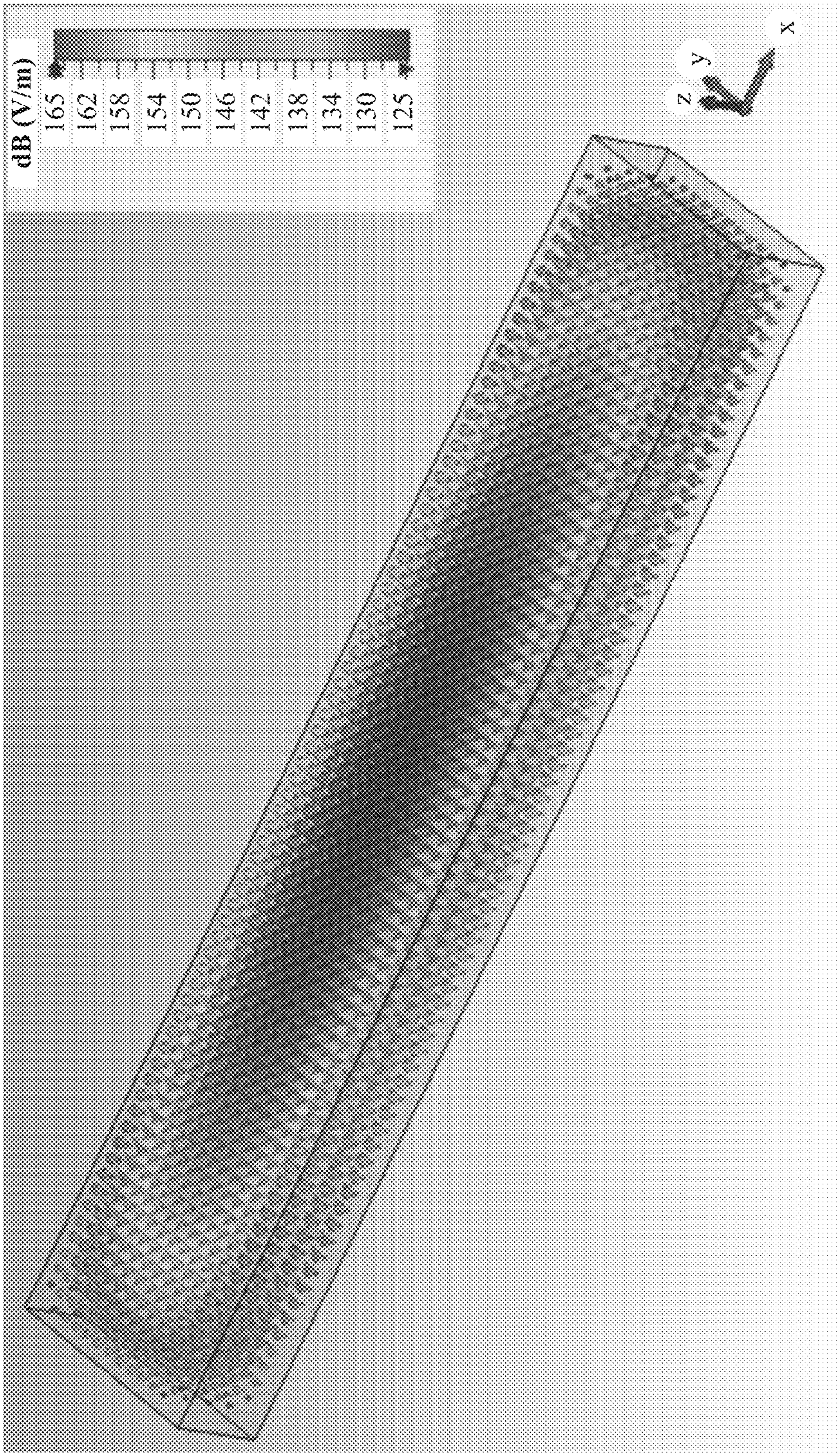
FIG. 6 is a schematic diagram of a strength change of an electric field in a $TE_{0.5\,0\,1}$ mode according to an embodiment of this application.
Figure 7:
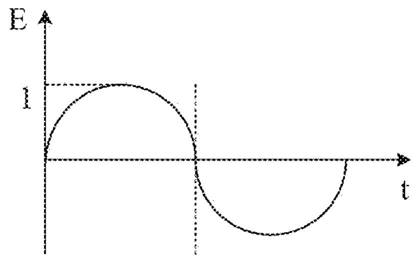
FIG. 7 is a schematic diagram of an intensity change of an electromagnetic wave according to an embodiment of this application.

It should be noted that the operating frequency band of the antenna 10A provided in this embodiment of this application is usually a frequency band of a fundamental mode of the first resonant cavity 11A, that is, the first resonant cavity 11A of the antenna 10A operates in a $TE_{0.5\ 0\ 1}$ mode. When the first resonant cavity 11A operates in the $TE_{0.5\ 0\ 1}$ mode, a distribution diagram of field strength of an electric field of the rectangular resonant cavity is shown in FIG. 6. In this case, the rectangular resonant cavity is split into two halves along an x direction, and one half of the rectangular resonant cavity is taken to obtain distribution of an equivalent electric field of the first resonant cavity 11A. In a positive direction of an X-axis, field strength of the electric field changes from weak to strong and then from strong to weak. This is equivalent to that an electrical signal travels in the positive direction of the X-axis by one half-wavelength as shown in FIG. 7. Similarly, in a positive direction of a Z-axis, the field strength of the electric field has no obvious change. This indicates that the electrical signal does not travel in the Z-axis direction, which is equivalent to zero half-wavelengths. In a positive direction of a Y-axis, the field strength of the electric field changes from strong to weak. This is equivalent to that the electrical signal travels in the positive direction of the Y-axis by 0.5 half-wavelengths. That is, m=1, n=0.5, and p=0 in the foregoing formula. A size of the first resonant cavity 11A may be used as an input to a simulation model, to calculate the length α of the equivalent cavity in the Y-axis direction and the length l of the equivalent cavity in the X-axis. The size of the first resonant cavity 11A includes the length of the first slot 11A1 and the length of the second slot 11A2.

The operating frequency band of the antenna in this application is related to a slot size of the first resonant cavity. Therefore, when the operating frequency band is determined, a slot size that better matches the operating frequency band of the antenna can be determined according to a first formula, so that performance of the antenna on the operating frequency band of the antenna is good, thereby increasing coverage in front of a screen of the electronic device adopting the antenna.

Optionally, the feed 12A is disposed at a location with maximum electric field strength of the fundamental mode in the first resonant cavity 11A.

For example, a point with the maximum electric field strength of the fundamental mode of the first resonant cavity 11A may be determined by simulating the first resonant cavity 11A, and then the feed 12A is disposed at this point.

In this embodiment of this application, the feed is disposed at the location with the maximum electric field strength of the fundamental mode of the first resonant cavity, so that impedance matching of the antenna that operates on the frequency band of the fundamental mode of the first resonant cavity can be better, thereby improving radiation efficiency and increasing bandwidth of the antenna.

Optionally, the antenna 10A further includes the filling medium 13A, and the filling medium 13A is disposed between the feed 12A and the first resonant cavity 11A for fixing the feed 12A.

It should be understood that the antenna usually uses a filling medium to adjust impedance of the antenna, so that the impedance of the antenna is best impedance.

In this embodiment of this application, the filling medium is used to fix the feed, that is, an existing component in the antenna may be used to fix the feed. This avoids using an independent device to fix the feed, avoids material wastes, and reduces antenna costs.

Optionally, the feed 12A is fixed to the metal backplane 10E by using a screw.

For example, a mounting flange for the screw may be disposed in the feed 12A, and a threaded hole for fixing the screw may be disposed in the metal backplane 10E. The screw may be inserted into the threaded hole through the mounting flange, to fix the feed 12A to the metal backplane 10E.

In this embodiment of this application, the feed may be fixed to the metal backplane by using the screw; so that a fixing manner of the feed is more convenient.

The following describes in detail, by using FIG. 8 to FIG. 12A to FIG. 12C, a principle of how to increase the signal coverage in front of the screen of the electronic device by using the antenna shown in FIG. 4.

A far radiation field of a slot antenna is determined only by field distribution at a slot. Therefore, the slot antenna disposed on the electronic device is less susceptible to a ground current induced by a metal backplane.

Figure 8:
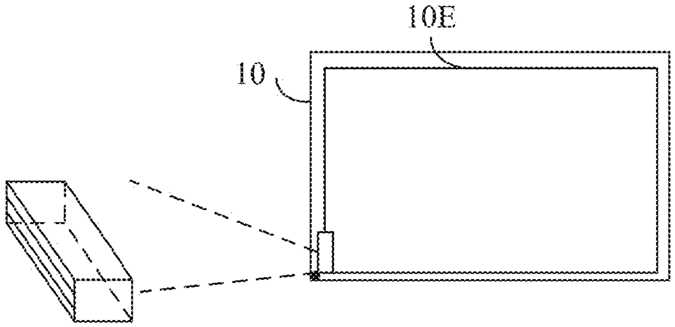
FIG. 8 is a schematic diagram of a structure of an antenna with a slot radiation port facing a left side according to an embodiment.
Figure 9A:
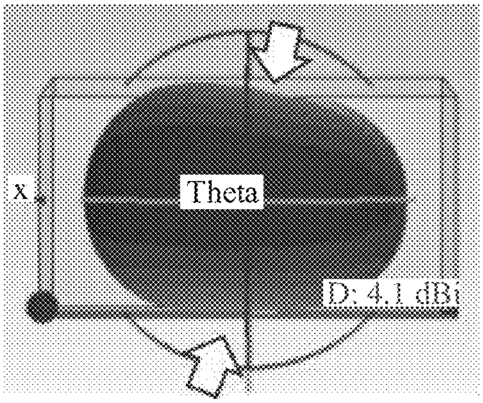
FIG. 9A to FIG. 9C are a directivity pattern of an antenna with a slot radiation port facing a left side, a schematic diagram of a horizontal direction parameter, and a distribution diagram of electric field strength according to an embodiment.
Figure 9B:
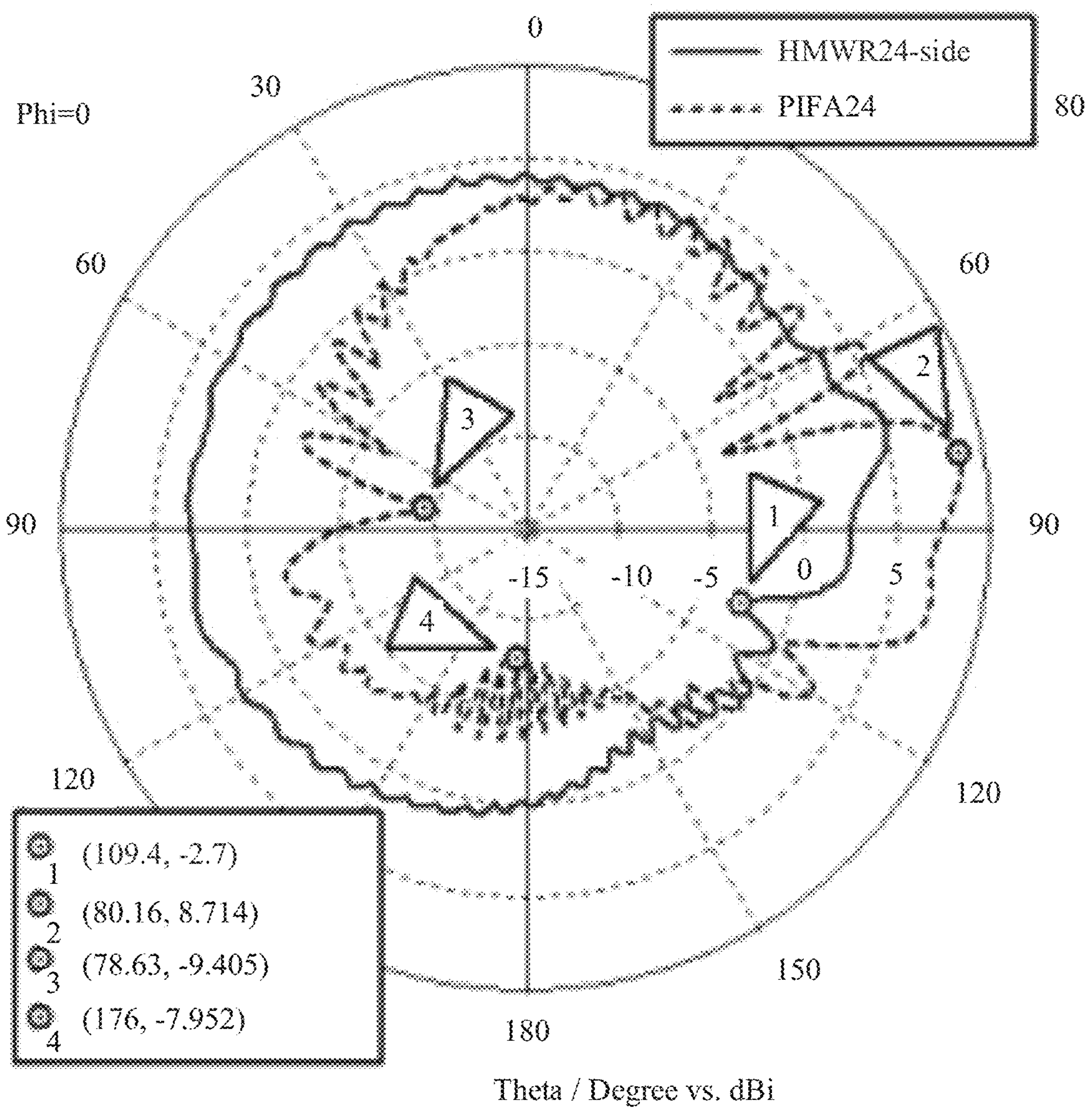
Figure 9C:
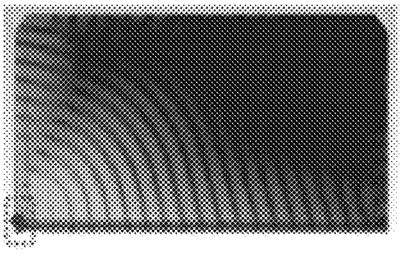
Figure 10:
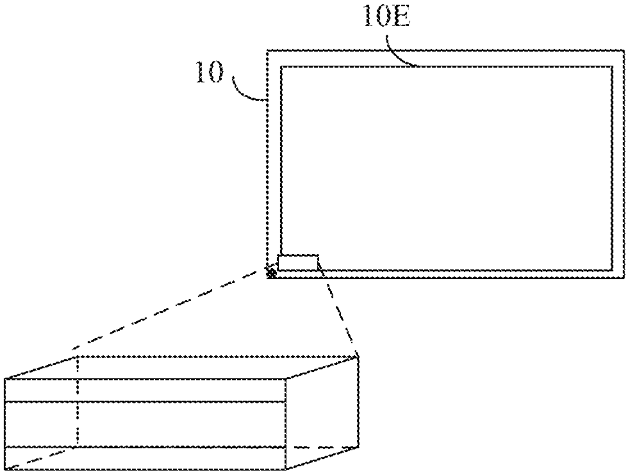
FIG. 10 is a schematic diagram of a structure of an antenna with a slot radiation port facing downward according to an embodiment.
Figure 11A:
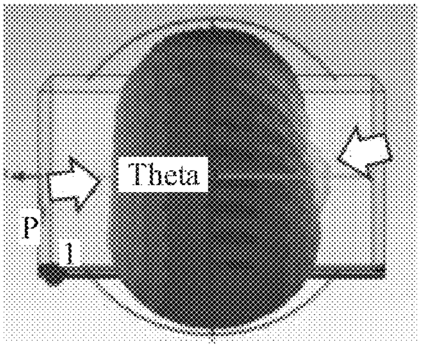
FIG. 11A to FIG. 11C are a directivity pattern of an antenna with a slot radiation port facing downward, a schematic diagram of a horizontal direction parameter, and a distribution diagram of electric field strength according to an embodiment.
Figure 11B:
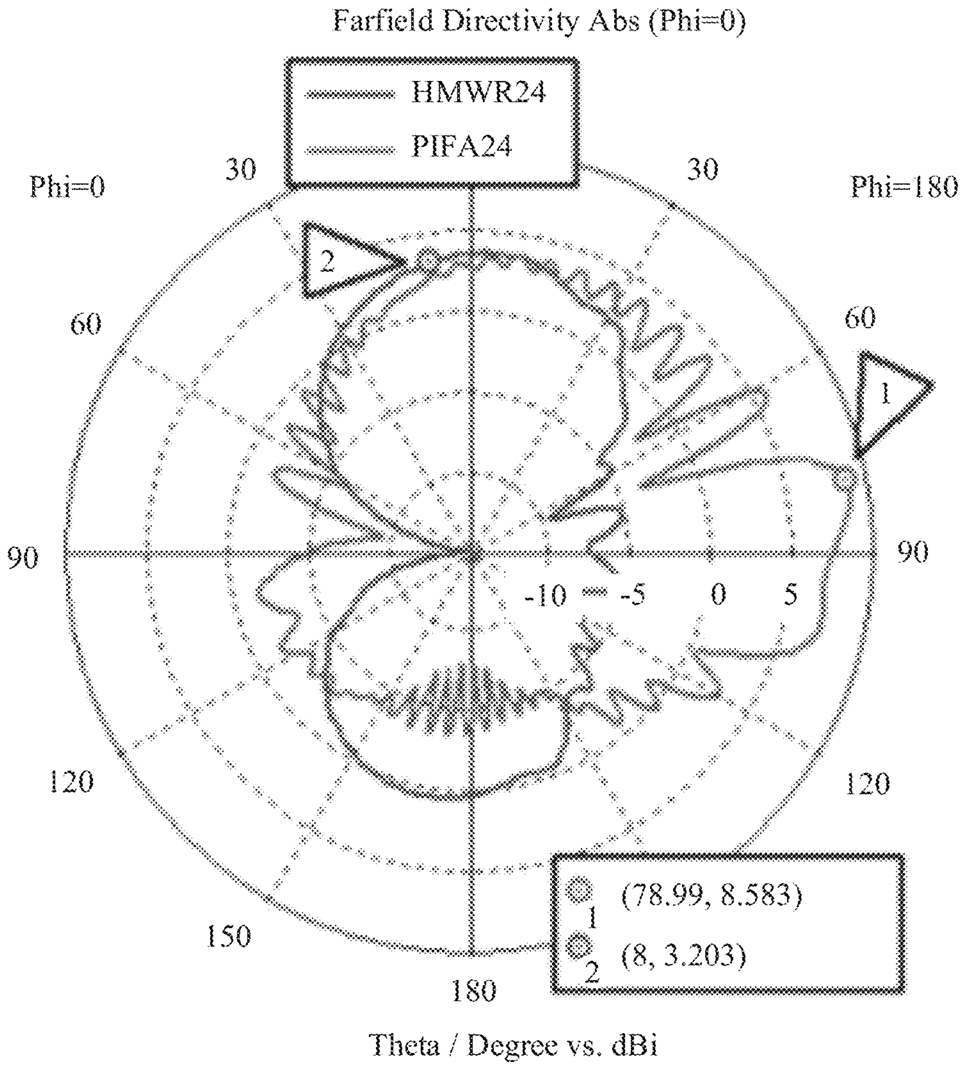
Figure 11C:
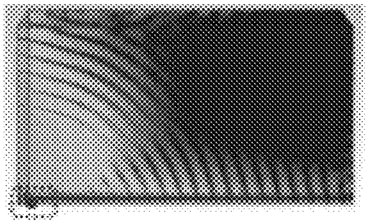

For example, as shown in FIG. 8, when a slot antenna with a slot radiation port facing a left side is disposed on the electronic device, the slot antenna is equivalent to a magnetic current in an axial direction. Therefore, the slot antenna has an omni-directional directivity pattern perpendicular to the axial direction, and has a low-profile vertical polarization characteristic. Due to an edge effect, there is still a relatively strong power line around an edge, and an electric field on a back side is excited by using an induced potential difference, to implement field coverage on the back side. Therefore, a directivity pattern of the slot antenna shown in FIG. 8 is shown in FIG. 9A, a horizontal direction parameter is shown in FIG. 9B, and a distribution diagram of electric field strength is shown in FIG. 9C. It can be learned that when the slot antenna with the slot radiation port facing the left side is used, signals in an upper area and a lower area in front of the screen of the electronic device are relatively poor. As shown in FIG. 10, when a slot antenna with a slot radiation port facing downward is disposed on the electronic device, a directivity pattern of the slot antenna is shown in FIG. 11A, a horizontal direction parameter is shown in FIG. 11B, and a distribution diagram of electric field strength is shown in FIG. 9C. It can be learned that when the slot antenna with the slot radiation port facing downward is used, signals in a left area and a right area in front of the screen of the electronic device are relatively poor.

Figure 12A:
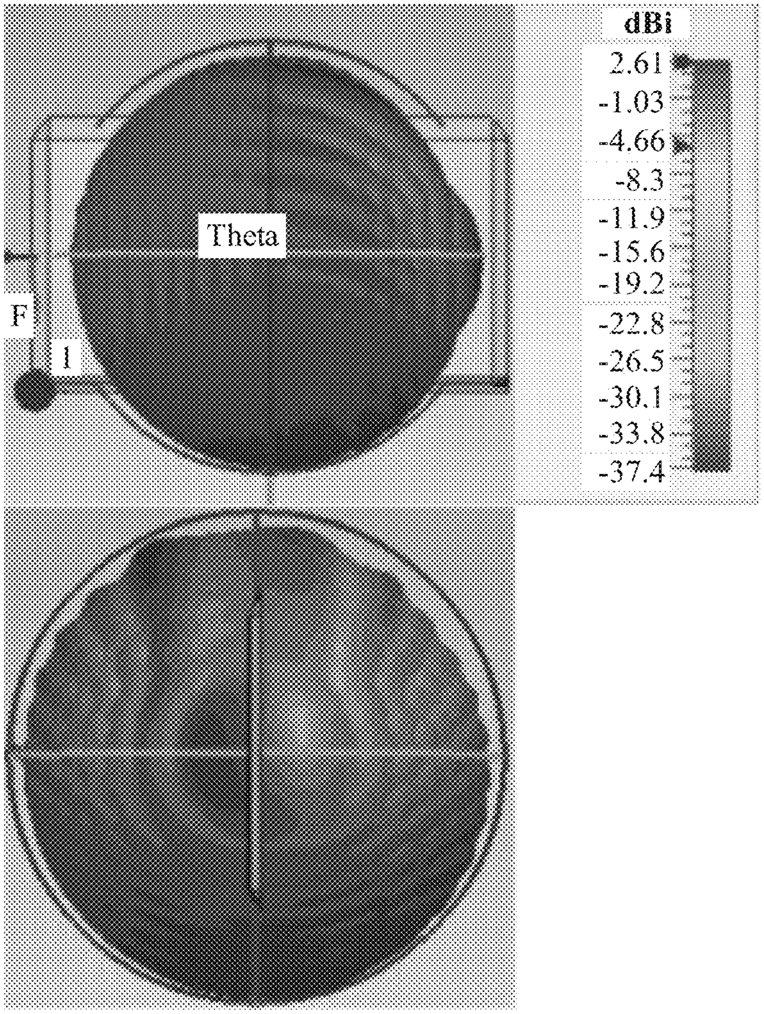
FIG. 12A to FIG. 12C are a directivity pattern of an antenna, a schematic diagram of a horizontal direction parameter, and a distribution diagram of electric field strength according to an embodiment of this application.
Figure 12B:
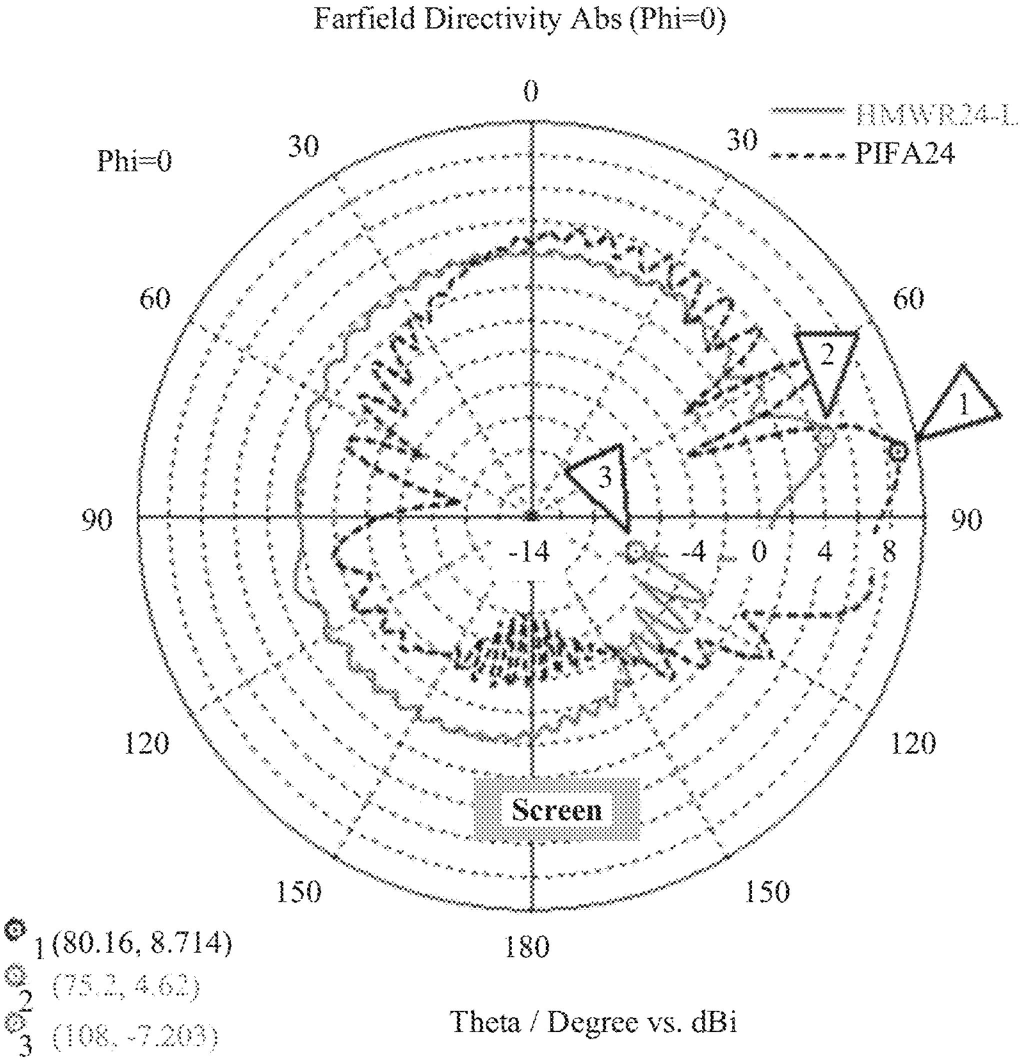
Figure 12C:
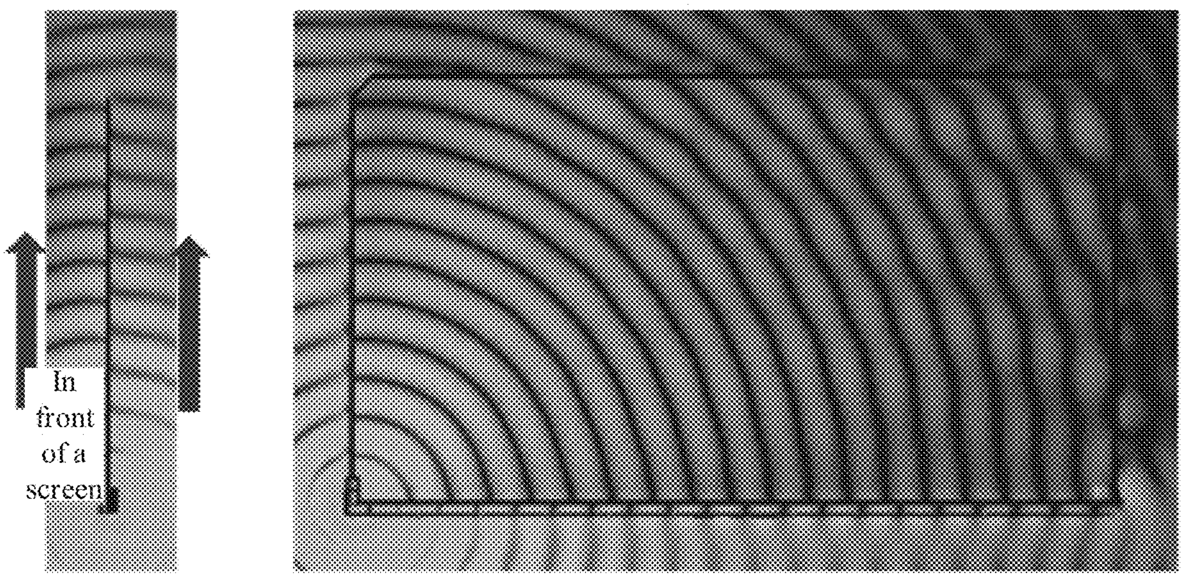

By using the antenna 10A shown in FIG. 4, because there are two directional slot radiation ports (namely, the first slot 11A1 and the second slot 11A2) on the antenna 10A, it is equivalent to increasing a direction dimension of the radiation port of the slot antenna, and directivity of the antenna 10A can be reduced. For example, a directivity pattern of the antenna 10A is shown in FIG. 12A, a horizontal direction parameter is shown in FIG. 12B, and a distribution diagram of electric field strength is shown in FIG. 12C. It can be learned that when the antenna 10A is used, signal coverage in front of the screen of the electronic device is good.

Optionally, a length of the first slot 11A1 is the same as a length of the second slot 11A2.

When the length of the first slot 11A1 is the same as the length of the second slot 11A2, it is equivalent to that lengths of the radiation ports of the antenna 10A at different directions are the same. The antenna 10A radiates a signal by using the first slot 11A1 and the second slot 11A2 with the same length, so that the signal can provide even coverage in each direction in front of the screen of the electronic device. This is equivalent to increasing coverage in front of the screen of the electronic device.

The antenna provided in this embodiment of this application is disposed in the electronic device. The electronic device includes the metal backplane, and the antenna includes a first resonant cavity and a feed. The first resonant cavity includes a first slot and a second slot, the first slot is provided on a first plane in the first resonant cavity, and the first plane is a plane on which a long side of the first resonant cavity is located. The second slot is provided on a second plane that is in the first resonant cavity and that is adjacent to the first plane, and the first plane and the second plane are perpendicular to a plane on which the metal backplane is located. The feed is disposed in the first resonant cavity for feeding the antenna. The antenna including the first resonant cavity is used to radiate a signal by using the first slot and the second slot on the first resonant cavity, so that the antenna in this embodiment of this application can be used to increase a dimension of a radiation direction of the slot antenna, thereby reducing antenna directivity. Therefore, the signal can cover most areas in front of the screen of the electronic device, increasing signal coverage in front of the screen of the electronic device.

Figure 13:
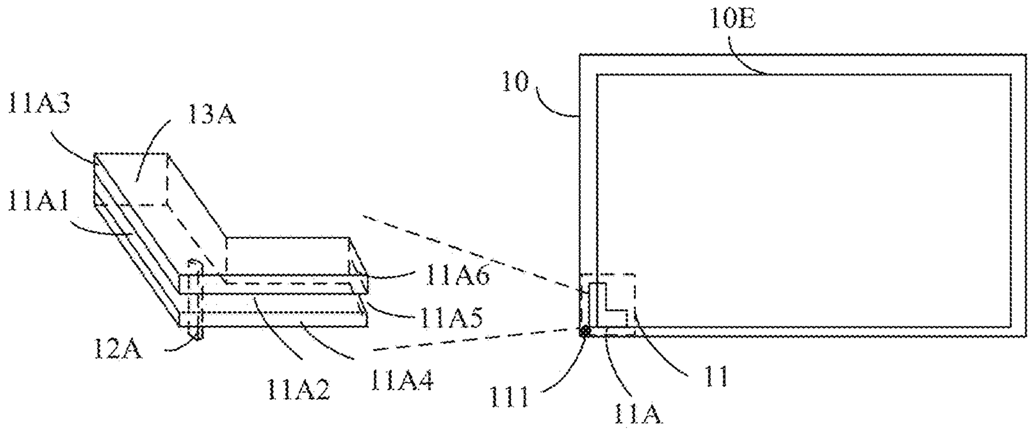
FIG. 13 is a schematic diagram of a structure of an antenna according to another embodiment of this application.

FIG. 13 is a schematic diagram of a structure of an antenna according to another embodiment of this application. As shown in FIG. 13, an antenna 10A is provided, and the antenna 10A is disposed in a first area 11 of an electronic device 10. The first area 11 is an area in which a first location 111 in the electronic device 10 is located, and the first location 111 is a location at which two sides of the electronic device 10 intersect. The electronic device 10 includes a metal backplane 10E, and the antenna 10A includes a first resonant cavity 11A, a feed 12A, and a filling medium 13A. The first resonant cavity includes a first slot 11A1, a second slot 11A2, and a third slot 11A5. The first slot 11A1 is provided on a first plane 11A3 that is in the first resonant cavity 11A and that is adjacent to the first location 111. The second slot 11A2 is provided on a second plane 11A4 that is in the first resonant cavity 11A and that is adjacent to the first location 111. The third slot 11A5 is provided on a third plane 11A6. The first plane 11A3, the second plane 11A4, and the third plane 11A6 are perpendicular to a plane on which the metal backplane 10E is located. The third plane 11A6 is adjacent to the first plane 11A3 or the second plane 11A4. The feed 12A is disposed in the first resonant cavity 11A, and is configured to connect to a signal transmission apparatus (not shown in the figure) in the electronic device 10. The filling medium 13A is disposed between the feed 12A and the first resonant cavity 11A for fixing the feed 12A.

It should be understood that a length of the third slot 11A5 may be the same as a length of the third plane 11A6, or may be slightly less than the length of the third plane 11A6. This is not limited in this embodiment of this application. The third plane 11A6 may be adjacent to the first plane 11A3, or the third plane 11A6 may be adjacent to the second plane 11A4. This is not limited in this embodiment of this application.

Figure 14:
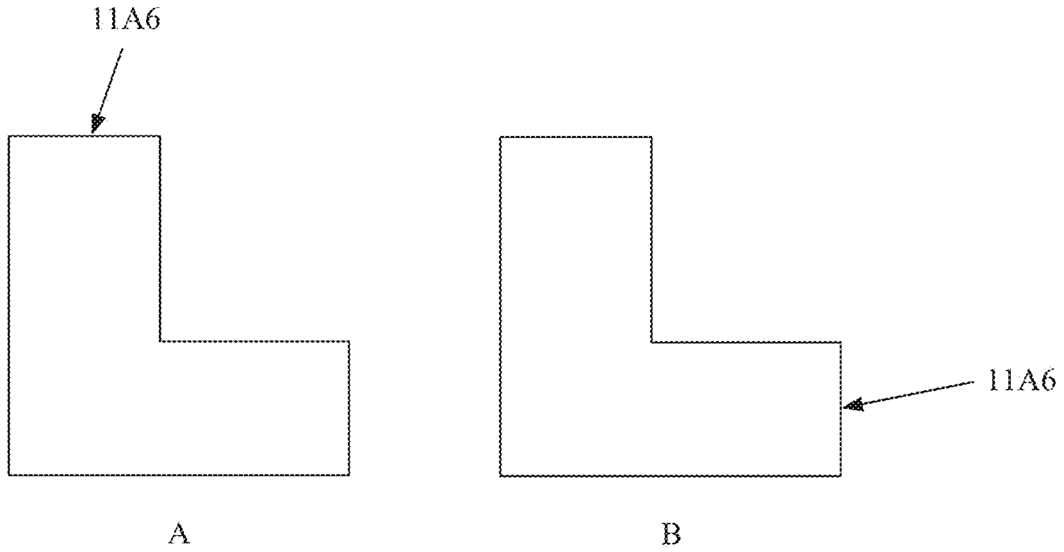
FIG. 14 is a schematic diagram of a location of a third plane according to an embodiment of this application.

In an example, when the first resonant cavity 11A is an L-shaped resonant cavity, the third plane 11A6 may be disposed at an upper location of the L-shaped resonant cavity, as shown in A in FIG. 14. Alternatively, the third plane 11A6 may be disposed on a side of the L-shaped resonant cavity, as shown in B in FIG. 14. This is not limited in this embodiment of this application.

Figure 15:
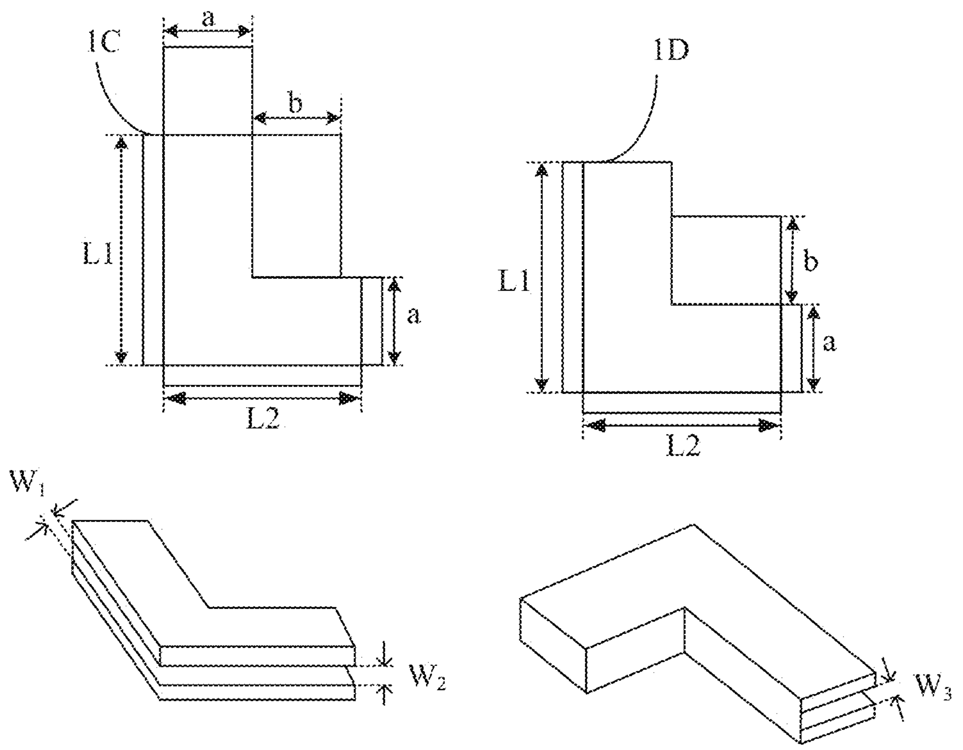
FIG. 15 is a schematic diagram of a structure of a first resonant cavity according to another embodiment of this application.

For example, the first resonant cavity 11A may be obtained by bending steel sheets shown in FIG. 15. As shown in FIG. 15, a third steel sheet 1C and a fourth steel sheet 1D are bent to obtain the first resonant cavity. L1 is a length of the first slot 11A1, L2 is a length of the second slot 11A2, L3 is a length of the third slot 11A5, a represents a width of the first resonant cavity 11A, b represents a height of the first resonant cavity 11A, $w_1$ represents a width of the first slot, $w_2$ represents a width of the second slot, and $w_3$ represents a width of the third slot. It should be noted that, $w_1$, $w_2$, and $w_3$ may be equal.

Figure 16:
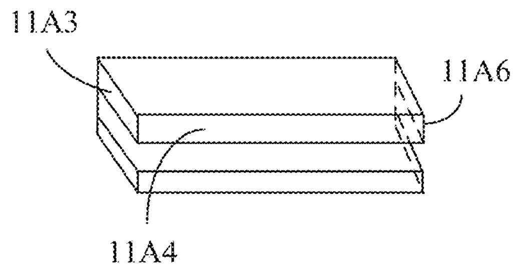
FIG. 16 is a schematic diagram of a structure of a first resonant cavity according to another embodiment of this application.

In an example, the first resonant cavity 11A may be a rectangular resonant cavity, and the first plane 11A3, the second plane 11A4, and the third plane 11A6 may be shown in FIG. 16.

When the first resonant cavity 11A includes the first slot 11A1, the second slot 11A2, and the third slot 11A5, an operating frequency band of the antenna 10A is associated with a size of the first slot 11A1, a size of the second slot 11A2, and a size of the third slot 11A5. A width of the slot does not affect a boundary condition of the antenna 10A. Therefore, the operating frequency band of the antenna 10A is associated with the length of the first slot 11A1, the length of the second slot 11A2, and the length of the third slot 11A5.

For example, the operating frequency band of the antenna 10A is determined according to the following formula:

$$f = \frac{1}{\sqrt{\mu\varepsilon}}\sqrt{\left(\frac{m}{2a}\right)^2 + \left(\frac{n}{2b}\right)^2 + \left(\frac{p}{2l}\right)^2},$$

where μ represents magnetic permeability of the filling medium 13A: ε represents permittivity of the filling medium 13A: m represents a quantity of half-wavelengths of an equivalent cavity in an X-axis direction, and the equivalent cavity is a rectangular resonant cavity equivalent to the first resonant cavity 11A: a represents a length of the equivalent cavity in the X-axis direction: n represents a quantity of half-wavelengths of the equivalent cavity in a Y-axis direction: b represents a length of the equivalent cavity in the Y-axis direction: p represents a quantity of half-wavelengths of the equivalent cavity in a Z-axis direction; and l represents a length of the equivalent cavity in the Z-axis direction, and the length of the equivalent cavity in the Z-axis direction is determined based on the length of the first slot 11A1, the length of the second slot 11A2, and the length of the third slot 11A5 on the first resonant cavity 11A.

When the equivalent cavity of the first resonant cavity 11A is determined, a size of the first resonant cavity 11A may be used as an input to a simulation model, to calculate the length α of the equivalent cavity in the X-axis direction and the length l of the equivalent cavity in the Z-axis. The size of the first resonant cavity 11A includes the length of the first slot 11A1, the length of the second slot 11A2, and the length of the third slot 11A5.

An implementation principle of the antenna shown in FIG. 13 is similar to that of the antenna shown in FIG. 4. Details are not described herein again.

An embodiment of this application provides an antenna, and the antenna is disposed in an electronic device. The electronic device includes a metal backplane, and the antenna includes a first resonant cavity and a feed. The first resonant cavity includes a first slot, a second slot, and a third slot. The first slot is provided on a first plane in the first resonant cavity. The second slot is provided on a second plane that is in the first resonant cavity and that is adjacent to the first plane. The third slot is provided on a third plane of the first resonant cavity. The first plane, the second plane, and the third plane are perpendicular to a plane on which the metal backplane is located. The third plane is adjacent to the first plane or the second plane. The feed is disposed in the first resonant cavity. The antenna including the first resonant cavity is used to radiate a signal by using the first slot, the second slot, and the third slot on the first resonant cavity, so that the antenna in this embodiment of this application can be used to increase a dimension of a radiation direction of a slot antenna, thereby reducing antenna directivity. Therefore, the signal can cover most areas in front of a screen of the electronic device, increasing signal coverage in front of the screen of the electronic device.

In a possible case, this application further provides an electronic device, and the electronic device includes the antenna provided in the foregoing embodiments.

A type of the electronic device is not limited in this embodiment of this application. For example, the electronic device may be but is not limited to a mobile phone, a tablet computer, a smart speaker, a smart large screen (also referred to as a smart television), a wearable device, or the like.

In an example, the electronic device includes a display, and a size of the display is greater than a preset threshold.

In an example, the electronic device is a smart large screen.

Figure 17:
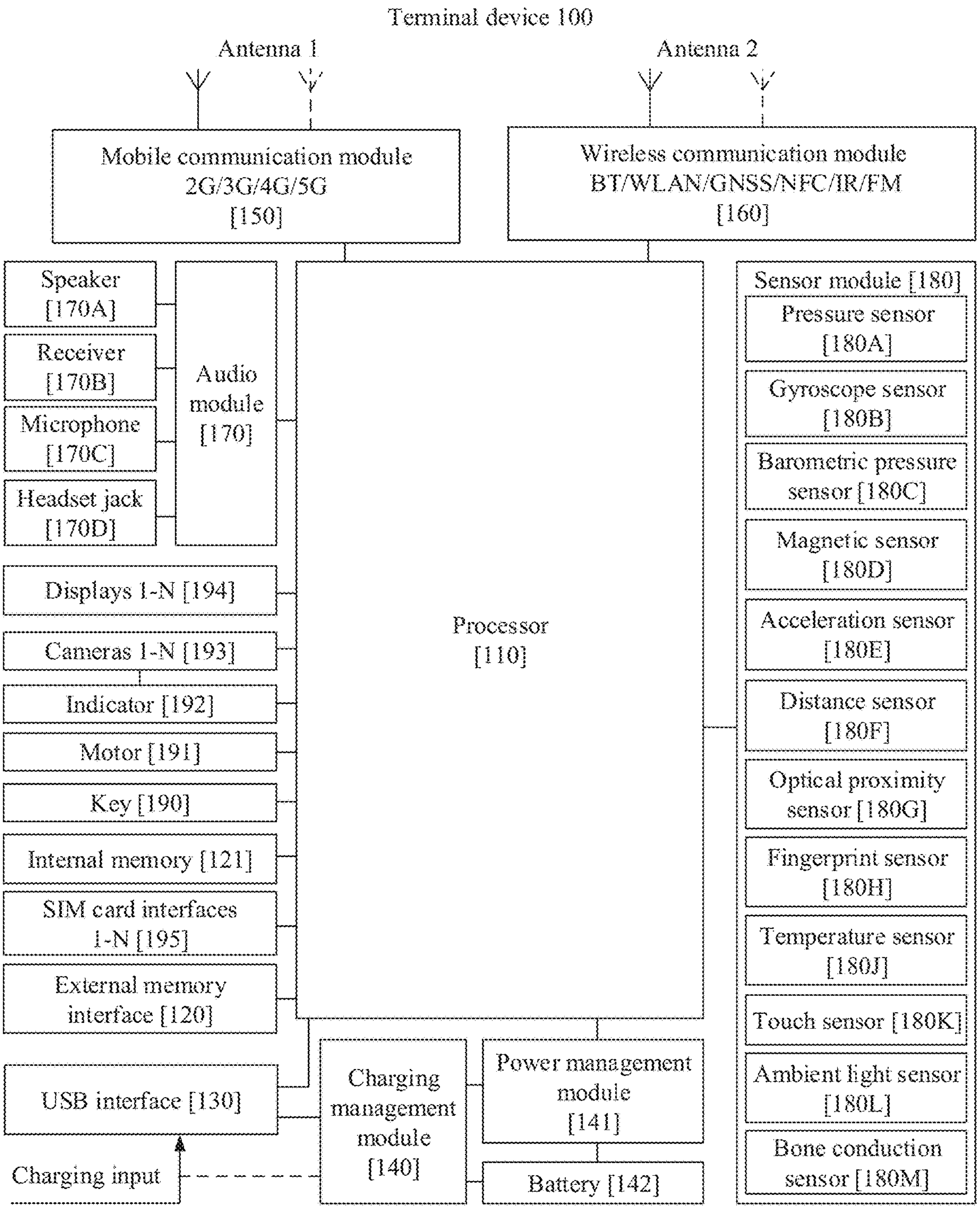
FIG. 17 is a schematic diagram of a structure of an electronic device according to an embodiment of this application.

For example, FIG. 17 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application constitutes no specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

It may be understood that an interface connection relationship between the modules that is shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution applied to the electronic device 100 for wireless communication including 2G/3G/4G/5G and the like. The mobile communication module 150 may include at least one filter, a switch, a power amplifier, a low noise amplifier (LNA), and the like. The mobile communication module 150 may receive an electromagnetic wave by using the antenna 1, perform processing such as filtering or amplification on the received electromagnetic wave, and transmit a processed electromagnetic wave to the modem processor for demodulation. The mobile communication module 150 may further amplify a signal obtained after modulation by the modem processor, and convert the signal into an electromagnetic wave for radiation by using the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium/high-frequency signal. The demodulator is configured to demodulate the received electromagnetic wave signal into a low-frequency baseband signal. Then, the demodulator transfers, to the baseband processor for processing, the low-frequency baseband signal obtained through demodulation. The low-frequency baseband signal is processed by the baseband processor and then transferred to the application processor. The application processor outputs a sound signal by using an audio device (not limited to the speaker 170A or the receiver 170B), or displays an image or a video by using the display 194. In some embodiments, the modem processor may be an independent device. In some other embodiments, the modem processor may be independent of the processor 110, and the modem processor and the mobile communication module 150 or another functional module are disposed in a same device.

The wireless communication module 160 may provide a wireless communication solution that is applied to the electronic device 100, including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), the 5th Generation of wireless communication system (5G), BT, GNSS, WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

It should be noted that any electronic device mentioned in this embodiment of this application may include more or fewer modules than those in the electronic device 100.

In the foregoing embodiments, descriptions of the embodiments have respective focuses. For a part that is not detailed or described in an embodiment, refer to related descriptions in other embodiments. It should be understood that sequence numbers of the steps in the foregoing embodiments do not mean execution sequences. The execution sequences of the processes should be determined based on functions and internal logic of the processes, and should not be construed as any limitation on the implementation processes of embodiments of this application. In addition, in this specification and the appended claims of this application, the terms such as "first", "second", and "third" are used only for the purpose of distinguishing descriptions, and should not be understood as indicating or implying relative importance. Referring to "one embodiment", "some embodiments", or the like that is described in this specification of this application means that specific characteristics, structures, or features described with reference to one or more embodiments are included in the one or more embodiments of this application. Therefore, statements such as "in one embodiment", "in some embodiments", "in some other embodiments" that appear in different parts of this application do not necessarily refer to same embodiments, but mean "one or more but not all embodiments" unless otherwise specifically emphasized.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An antenna, wherein the antenna is disposed in an electronic device, wherein the electronic device comprises a metal backplane, and wherein the antenna comprises:

a first resonant cavity; and a feed;

wherein the first resonant cavity comprises a first slot and a second slot, wherein the first slot is provided on a first plane in the first resonant cavity, and the second slot is provided on a second plane that is in the first resonant cavity and that is adjacent to the first plane;

wherein the first plane and the second plane are perpendicular to a plane on which the metal backplane is located;

wherein the feed is disposed in the first resonant cavity for feeding the antenna; and wherein one end of the first slot and one end of the second slot are communicated at a third edge, the other end of the first slot is flush with a fourth edge, the other end of the second slot is flush with a fifth edge, the third edge is the edge that intersects the first plane with the second plane, the fourth edge is the edge on the first plane that does not intersect with the third edge, and the fifth edge is the edge on the second plane that does not intersect with the third edge.

2. The antenna according to claim 1, wherein the first resonant cavity is an L-shaped resonant cavity.

3. The antenna according to claim 1, wherein the first resonant cavity is disposed at a location at which a first side and a second side of the electronic device intersect, wherein a distance between the first plane and the first side is the smallest, and wherein a distance between the second plane and the second side is the smallest.

4. The antenna according to claim 3, wherein the first side and the second side are outer frames of the electronic device.

5. The antenna according to claim 1, wherein a size of the first slot and a size of the second slot are associated with an operating frequency band of the antenna.

6. The antenna according to claim 1, wherein a length of the first slot is the same as a length of the second slot.

7. The antenna according to claim 1, wherein the antenna further comprises a filling medium, and the filling medium is disposed between the feed and the first resonant cavity for fixing the feed.

8. The antenna according to claim 1, wherein the first resonant cavity further comprises a third slot, the third slot is provided on a third plane in the first resonant cavity, the third plane is adjacent to the first plane or the second plane, and the third plane is perpendicular to the plane on which the metal backplane is located.

9. The antenna according to claim 8, wherein a size of the first slot, a size of the second slot, and a size of the third slot are associated with an operating frequency band of the antenna.

10. The antenna according to claim 9, wherein the operating frequency band of the antenna is determined according to a first formula, and the first formula comprises:

$$f = \frac{1}{\sqrt{\mu\varepsilon}} \sqrt{\left(\frac{m}{2a}\right)^2 + \left(\frac{n}{2b}\right)^2 + \left(\frac{p}{2l}\right)^2},$$

wherein:

μ represents magnetic permeability of a filling medium;

ε represents permittivity of the filling medium;

m represents a quantity of half-wavelengths of an equivalent cavity in an X-axis direction, and the equivalent cavity is a rectangular resonant cavity equivalent to the first resonant cavity;

a represents a length of the equivalent cavity in the X-axis direction;

n represents a quantity of half-wavelengths of the equivalent cavity in a Y-axis direction;

b represents a length of the equivalent cavity in the Y-axis direction;

P represents a quantity of half-wavelengths of the equivalent cavity in a Z-axis direction; and l represents a length of the equivalent cavity in the Z-axis direction, and the length of the equivalent cavity in the Z-axis direction is determined based on a slot size of the first resonant cavity.

11. The antenna according to claim 1, wherein the feed is disposed at a location with maximum electric field strength of a fundamental mode in the first resonant cavity.

12. The antenna according to claim 1, wherein the feed is fixed to the metal backplane using a screw.

13. The antenna according to claim 1, wherein the antenna radiates signals through the first slot and the second slot.

14. The antenna according to claim 1, wherein the first resonant cavity is a resonant cavity of a cuboid.

15. An electronic device, comprising:

a metal backplane; and an antenna, wherein the antenna comprises a first resonant cavity and a feed;

wherein the first resonant cavity comprises a first slot and a second slot, wherein the first slot is provided on a first plane in the first resonant cavity, and the second slot is provided on a second plane that is in the first resonant cavity and that is adjacent to the first plane;

wherein the first plane and the second plane are perpendicular to a plane on which the metal backplane is located;

wherein the feed is disposed in the first resonant cavity for feeding the antenna; and wherein one end of the first slot and one end of the second slot are communicated at a third edge, the other end of the first slot is flush with a fourth edge, the other end of the second slot is flush with a fifth edge, the third edge is the edge that intersects the first plane with the second plane, the fourth edge is the edge on the first plane that does not intersect with the third edge, and the fifth edge is the edge on the second plane that does not intersect with the third edge.

16. The electronic device according to claim 15, wherein the electronic device comprises a display, and a size of the display is greater than a preset threshold.

17. The electronic device according to claim 16, wherein the electronic device is a smart television.

* * * * *